(12) United States Patent
Keefe et al.

(10) Patent No.: US 11,034,191 B2
(45) Date of Patent: Jun. 15, 2021

(54) TIRE TREAD

(71) Applicant: COMPAGNIE GENERALE DES ETABLISSEMENTS MICHELIN, Clermont-Ferrand (FR)

(72) Inventors: Brian Keefe, Clermont-Ferrand (FR); Walid Djabour, Clermont-Ferrand (FR); Arnaud Larregain, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 394 days.

(21) Appl. No.: 16/089,920

(22) PCT Filed: Apr. 5, 2017

(86) PCT No.: PCT/FR2017/050797
§ 371 (c)(1),
(2) Date: Sep. 28, 2018

(87) PCT Pub. No.: WO2017/174925
PCT Pub. Date: Oct. 12, 2017

(65) Prior Publication Data
US 2020/0346495 A1 Nov. 5, 2020

(30) Foreign Application Priority Data
Apr. 8, 2016 (FR) ...................................... 1653111

(51) Int. Cl.
*B60C 11/13* (2006.01)
*B60C 11/03* (2006.01)

(52) U.S. Cl.
CPC ... *B60C 11/0323* (2013.01); *B60C 2011/0353* (2013.01); *B60C 2011/0355* (2013.01); *B60C 2200/06* (2013.01)

(58) Field of Classification Search
CPC ......... B60C 11/0323; B60C 2011/0353; B60C 2011/0355; B60C 2200/06; B60C 11/033;
(Continued)

(56) References Cited

U.S. PATENT DOCUMENTS 2,322,505 A * 6/1943 Bull .................... B60C 11/0323
152/209.21
4,703,787 A * 11/1987 Ghilardi ............. B60C 11/0323
152/209.21
(Continued)

FOREIGN PATENT DOCUMENTS

| CN | 102596595 | 7/2012 |
|---|---|---|
| CN | 104837654 | 8/2015 |

(Continued)

*Primary Examiner* — Robert C Dye
*Assistant Examiner* — Jack Edmondson Odom
(74) *Attorney, Agent, or Firm* — Cozen O'Connor

(57) ABSTRACT

A tire tread including a tread surface adapted to come into contact with a road surface has at least one main groove that, when new, opens onto the tread surface of the tread, this main groove having a maximum depth. The main groove includes a plurality of first groove portions and a plurality of second groove portions, the first and second groove portions being arranged alternately such that a first portion is followed by a second portion. Each first groove portion has a width that decreases with wear, and each second groove portion has a width that increases with wear.

7 Claims, 2 Drawing Sheets

(58) Field of Classification Search
CPC ............. B60C 11/1281; B60C 11/1218; B60C 11/0365
See application file for complete search history.

(56) References Cited

U.S. PATENT DOCUMENTS

| | | | |
|---|---|---|---|
| 2003/0201048 A1* | 10/2003 | Radulescu | B29D 30/0606 152/209.25 |
| 2008/0163970 A1* | 7/2008 | Ohara | B60C 11/0309 152/523 |
| 2011/0120610 A1* | 5/2011 | Fugier | B60C 11/1218 152/209.21 |
| 2013/0213542 A1* | 8/2013 | Warfford | B60C 11/0327 152/209.18 |
| 2014/0130950 A1* | 5/2014 | Guichon | B60C 11/13 152/209.18 |
| 2014/0166172 A1* | 6/2014 | Berger | B60C 11/1281 152/209.21 |
| 2016/0297252 A1* | 10/2016 | Cambon | B60C 11/1236 |

FOREIGN PATENT DOCUMENTS

| | | |
|---|---|---|
| EP | 2311655 | 4/2011 |
| EP | 2675633 B1 | 5/2015 |
| EP | 2790930 B1 | 3/2018 |
| FR | 2 971 732 | 8/2012 |
| JP | H 04-278809 | 10/1992 |
| WO | WO 2011/039194 | 4/2011 |
| WO | WO 2011/101495 | 8/2011 |
| WO | WO 2015/086622 | 6/2015 |
| WO | WO 2015/086624 | 6/2015 |
| WO | WO-2015082310 A1 * | 6/2015 ......... B60C 11/0332 |

* cited by examiner

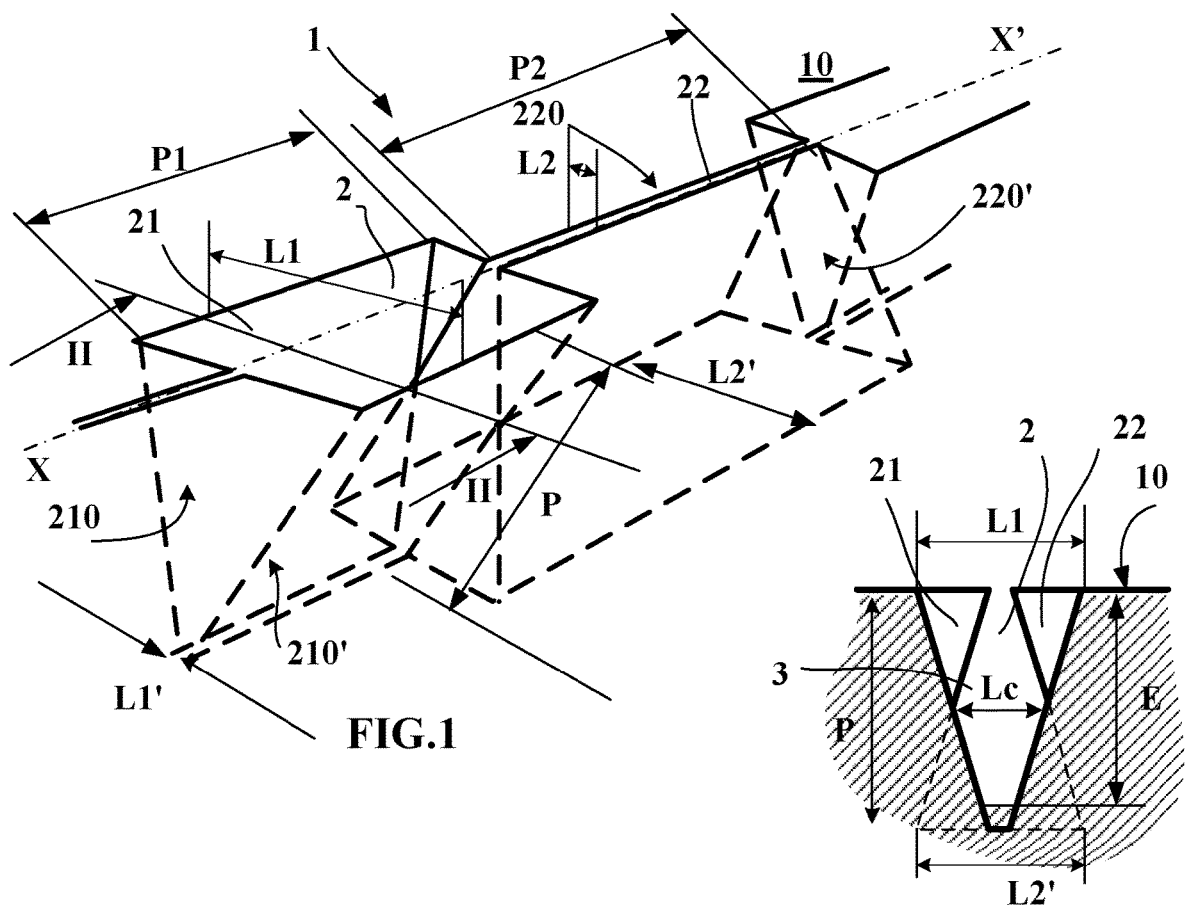
FIG.1
FIG.2
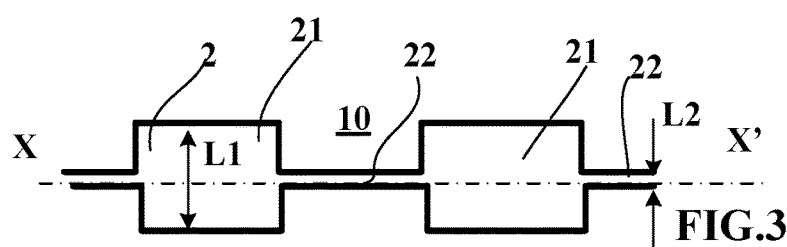
FIG.3
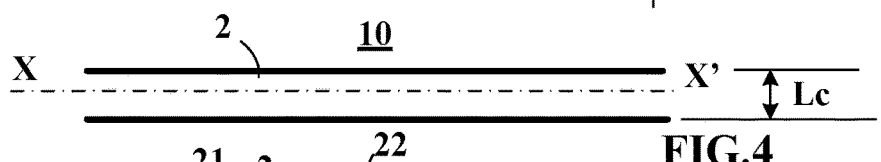
FIG.4
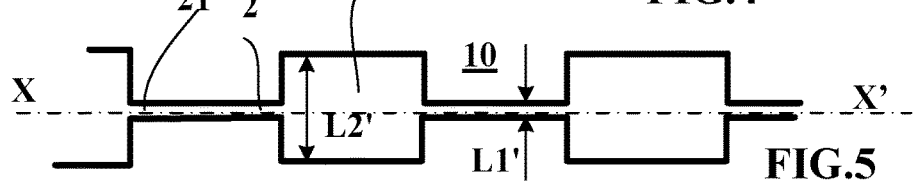
FIG.5

TIRE TREAD

RELATED APPLICATIONS

This is a U.S. National Phase Application under 35 USC 371 of International Application PCT/FR2017/050797 filed on Apr. 5, 2017.

This application claims the priority of French application no. 1653111 filed Apr. 8, 2016, the entire content of which is hereby incorporated by reference.

FIELD OF THE INVENTION

The invention relates to treads for tires and more particularly to the designs of the tread pattern for these treads and to the tires provided with such treads, the ability of which to drain away water present on the road surface becomes more lasting with wear, these treads also having improved wearing performance.

BACKGROUND OF THE INVENTION

As is known, the use of tires on vehicles in wet weather running conditions requires rapid elimination of the water present in the contact patch in which the tire makes contact with the road surface in order to ensure that the material making up the tread comes into contact with this road surface and thus for it to be possible to generate traction and braking forces while controlling the path of the vehicle. The water which is not pushed ahead of the tire flows or is collected partially in the grooves formed in the tread of the tire in order to allow contact between the tire and the road surface.

The grooves form a flow network for the water which needs to be lasting, that is to say effective throughout the duration of use of a tire between its new state and its removal once its level of wear reaches the limit set by regulations.

For tires intended for the steering or load-bearing axles of a heavy-duty vehicle, it is common practice to form, in the tread of these tires, circumferential (or longitudinal) grooves, the depth of which is equal to the total thickness of the tread (this total thickness not taking into consideration the thickness that may be intended for allowing partial renewal of the grooves through an operation referred to as regrooving). Thus, a tread has a water drainage performance which is always at least equal to a minimum performance referred to as the safe performance, this being true regardless of the level of wear of this tread.

For prior art tires, the total voids volume when new is, as a general rule, around at least 10% and at most equal to 35% of the total volume of the tread intended to be worn away during running. The voids volume comprises, when new, the volume of all the grooves, sipes and cavities formed in the tread; the total volume of the tread corresponds to the volume of material measured down to the bottom of the innermost cavities of the tread, to which the total voids volume is added.

It is found that these prior art tires have an available voids volume in the contact patch which is relatively high in the new state (available voids volume meaning that this volume is potentially able to be partially or completely filled with the water present on the road surface in wet weather). The voids volume opening onto the tread surface in the contact patch is evaluated when the tire is subjected to its standard static compression and inflation conditions as notably defined for Europe by the E. T. R. T. O. standard. In order to guarantee effectiveness in draining the water present on a road surface, those skilled in the art take into account both the volume of voids that open into the contact patch and the surface area of the voids formed on the tread surface coming into contact with the road surface during running.

While grooves or, more generally, cavities are essential to draining away water in the contact patch in contact with a road surface, the resulting reduction in material on the tread may appreciably affect the wearing performance of this tread and consequently reduce the duration for which the tire can be used that results notably from an increase in the rate of wear of said tread. Other tire performance aspects may also be affected, such as the handling performance, road noise performance, or rolling resistance.

It is also found that these grooves, formed so as to have a working depth equal to the tread height to be worn away, may be the cause of endurance problems. Under certain running conditions, objects such as stones may be trapped in these grooves and attack the bottom of these grooves, causing breaks to appear in the material forming the tread. These breaks may result in water infiltrating into the tread as far as the reinforcements.

Creating a plurality of grooves on a tread therefore has the drawback of reducing the quantity of tread material for a given width of tread and therefore of reducing the service life of the tire as a result of an excessively high wear rate.

Moreover, the grooves reduce the compression and shear stiffnesses because these grooves delimit portions of material which are sensitive to deformation compared with the portions delimited by sipes. Specifically, in the case of a sipe, the walls of material delimiting this sipe can come into contact with one another at least in part in the contact patch in contact with the road surface. This reduction in stiffness, in the case of the presence of grooves, leads to an increase in deformation and generates a reduction in the wearing performance of the tread: more pronounced wear is observed for a set distance covered (which corresponds to an increase in the rate of wear of the tread). Furthermore, an increase in rolling resistance and therefore in fuel consumption of vehicles equipped with such tires is observed as a result of an increase in the hysteresis losses associated with the cycles of deformation of the material of which the tread is made.

It has been proposed to form, inside a tread, a plurality of channels intended to form new grooves after a predetermined wear. Document FR2971732 A describes such a tread. This document shows a sipe surmounting each channel, this sipe itself connecting a plurality of wells extending from the tread surface when new to the channel. While the stiffness of the tread is increased compared to that of a tread provided with open grooves when new over the tread surface, the ability to evacuate liquid may still be insufficient under some running conditions.

In order to limit the lowering in stiffness associated with the presence of grooves that is required for the purpose of ensuring the drainage of water, a solution described in the patent publication WO 2011/039194 has been proposed. According to this solution, a tire tread is proposed having a thickness of material to be worn away, this tread being provided with a plurality of undulating grooves that open in a discontinuous manner on the tread surface when new and having an undulating geometry in the direction of the thickness of the tread. Each undulating groove is discontinuous at the surface but continuous when new within the tread so as to allow fluid to flow. This undulating groove is formed in the tread by a series of external cavities that open onto the tread surface when new and a plurality of internal cavities, the latter being positioned radially and entirely inside the tread surface in the new state between the external cavities. The internal cavities may be designed to lie at different depths within the tread.

Moreover, the continuity of the flow of water in each undulating groove when new is ensured by a continuity of passage between the external cavities and internal cavities. This continuity is provided by linking cavities. By virtue of the presence of these linking cavities, it is possible to ensure circulation of the water from an external cavity to an internal cavity and thus to obtain better drainage of the water.

In order to make it easier to mould and demould this type of undulating groove, combining each undulating groove with sipes that continue the internal cavities as far as the tread surface when new has been considered.

By virtue of this tread structure, despite a voids volume that is reduced compared with that of the usual grooves, a tread is obtained having satisfactory drainage when new. This type of groove thus makes it possible to limit the reduction in stiffness of the tread when new that is associated with the formation of voids.

While this type of groove performs well when new and down to partial wear corresponding to the disappearance of the external cavities, it is clear that when the internal cavities open onto the tread surface, these cavities are discontinuous and it is necessary to provide an additional flow network for example by forming cavities under the tread surface in the new state that are converted into continuous grooves following partial wear.

Therefore, there is a need to maintain a good ability to drain fluids regardless of the level of wear, while reducing the voids volume to the bare minimum required without impairing the wearing performance either in terms of wear rate or in terms of regularity of wear. This is an object of the present invention.

Definitions

An equatorial mid-plane is a plane perpendicular to the axis of rotation and passing through the points of the tire that are radially farthest from said axis.

A radial direction means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

A tread has a maximum thickness of material to be worn away during running; this maximum thickness corresponds to the depth from which it becomes necessary to renew the tire, either by retreading or by replacing with a new tire.

The usual running conditions of the tire or use conditions are those which are defined by the E. T. R. T. O. standard for running in Europe; these use conditions specify the reference inflation pressure corresponding to the load-bearing capacity of the tire as indicated by its load index and speed rating. These use conditions can also be referred to as "nominal conditions" or "working conditions".

A cut generically denotes either a groove or a sipe and corresponds to the space delimited by walls of material that face one another and are at a non-zero distance (referred to as the "width of the cut") from one another. It is precisely this distance that distinguishes a sipe from a groove; in the case of a sipe, this distance is appropriate for allowing the opposing walls that delimit said sipe to come into at least partial contact at least when in the contact patch in contact with the road surface. In the case of a groove, the walls of this groove cannot come into contact with one another under the usual running conditions as defined for example by the E. T. R. T. O.

A groove is said to be continuous when it opens onto the tread surface when new, specifically along its entire length in its main direction.

A groove is said to be discontinuous when it is formed from a succession of open parts on the tread surface when new, these parts being separate from one another in the main direction of this groove (i.e. over its extent).

The mean surface of a continuous or discontinuous groove is defined as being a virtual surface that divides this groove, in the main direction of this groove, into two parts which are equal or substantially equal in terms of volume.

The main direction of a groove corresponds to the direction of a flow of water in the groove when running on a road surface covered with water.

BRIEF DESCRIPTION OF THE INVENTION

One object of the present invention is to obtain a tire having a tread that provides the tire with good running performance in wet weather while providing a tread pattern design that is improved in terms of wear and more particularly that is able to reduce the risks of irregular wear.

To this end, one aspect of the invention is directed to a tire tread comprising a tread surface intended to come into contact with a road surface, this tread having at least one main groove that, when new, opens onto the tread surface of the tread, this groove having a maximum depth P, this main groove comprising a plurality of first groove portions and a plurality of second groove portions, these first and second groove portions being arranged alternately such that a first portion is followed by a second portion, this tread being characterized in that each first groove portion has a width that decreases with wear, each first groove portion having a maximum width L1 measured on the tread surface when new and a maximum width L1' at the depth P, the maximum width L1 at the depth P being less than the maximum width L1, each second groove portion has a width that increases with wear, each second groove portion having a maximum width L2 measured on the tread surface when new and a maximum width L2' at the depth P, the maximum width L2 being less than the maximum width L2', the first and second groove portions are arranged so as to form a void passage between the volumes delimited by the first and second groove portions over the whole length of the groove, this passage having a cross section, the maximum width of which is located between 30% and 85% of the depth P of the groove.

This passage is continuous in the direction of the groove, that is to say that it is not interrupted which permanently enables the flow of a fluid in the groove.

In addition, the variations in the widths between the maximum widths and the minimum widths, whether for the first or second groove portions, are gradual, that is to say they are formed by regular surfaces connecting the groove portions to one another. These variations may be made continuously or discontinuously.

In this way, a void surface area and a volume of use for drainage are obtained, which are optimal regardless of the state of wear while increasing the quantity of tread material in contact with the road surface, this having the effect of increasing the wearing life. This technical solution makes it possible to obtain a content of surface voids at least equal to 40% and at most equal to 60% of the surface area of surface voids obtained with a continuous groove with a width equal to the maximum width L1 of the open parts on the tread surface when new. This same relationship is retained when the wear of the tread is 50% of its thickness to be worn away, or even 90% of its thickness.

The depth P of the groove is greater than the thickness E of material to be worn away so that, when the wear limit is reached, there is still enough voids to ensure capture of water in wet weather.

The change in the geometry of the corner edges of the groove (intersections of the walls of the groove with the tread surface) is continuous with wear, which is favourable for the resulting wear pattern.

Moreover, the total volume of voids when new may be appropriate for the bare minimum required at all stages of wear of the tread. Advantageously, the volumetric voids ratio when new is between 5% and 16% and even more preferentially between 7% and 12%.

Preferentially, the maximum widths L1 and L2' of the first and second groove portions are at least equal to 5 mm.

Preferentially, for heavy-duty tires, the minimum width L2 is less than 2 mm and preferentially less than 1 mm in order to ensure contact between opposite walls when in the contact patch in contact with a road surface.

In a variant of the invention, the width L1' of the bottom of the first portions is at least five times larger than the width L2 of the second portions at the tread surface. Advantageously, the volumes of the first groove portions are identical, or virtually identical, to the volumes of the second portions. When the volumes are virtually identical, this means that the difference in volume is at most 10% of the largest volume.

In a beneficial variant, it is possible to choose a length of the first portions which is smaller than that of the second portions. The lengths of each of the portions are measured in the main direction of these portions, that is to say in the main flow direction of the water inside said portions.

In order to promote a flow of liquid in the groove according to the invention while limiting load losses, it is advisable to provide, between a first groove portion and a second groove portion, a connection region that reduces the geometrical discontinuities between said portions.

In a beneficial variant of the invention, the groove according to the invention intersects the tread surface when new along two corner edges, these corner edges having identical and symmetrical geometries relative to an axis extending in the main direction of the groove.

In another variant of the invention, the groove according to the invention intersects the tread surface when new along two corner edges, these corner edges having identical geometries that are offset relative to one another in the main direction of the groove.

Advantageously, the lengths of the first and second groove portions are equal or substantially equal. Of course, these lengths may be adapted depending on the desired goal.

Further features and advantages of the invention will become apparent from the following description with reference to the appended drawings which show, by way of non-limiting examples, embodiments of the subject matter of the invention.

BRIEF DESCRIPTION OF THE FIGURES

FIG. 1 represents a partial view of a tread comprising a main groove according to a variant of the invention;

FIG. 2 shows a view in cross section of the tread shown in FIG. 1 on a section plane, the line of which is indicated by the line II-II;

FIGS. 3 to 5 show the corner edges formed by the groove on the tread surface at different levels of wear;

DETAILED DESCRIPTION OF THE FIGURES

Figure 6:
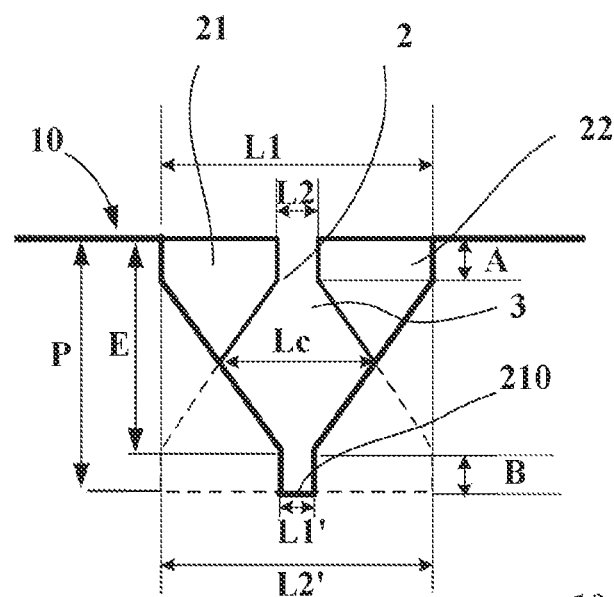
FIG. 6 represents, in section, another variant of a groove according to the invention.

To make the figures easier to understand, identical reference signs have been used to describe variants of the invention where these reference signs refer to elements of the same kind, whether structurally or functionally.

FIG. 1 represents a partial three-dimensional view of a tread 1 comprising a main groove according to the invention. This tread 1 comprises a tread surface 10 intended to come into contact with the road surface during running.

In this FIG. 1, a groove 2 according to the invention can be seen, formed by a series of cavities forming first groove portions 21 and second groove portions 22.

In this view, the first groove portions 21 have a generally triangular shape in cross section, the width of which on the tread surface of the tread when new is equal to L1, while at a depth P corresponding to the depth of the groove, the width of the bottom of this first portion is equal to L1'. The latter width L1' is less than the width L1 at the surface.

In the extension of this first portion 21, there is a second portion 22 which corresponds in volume to the volume of the first portion 21 and which is upside-down relative to the first portion. In this variant, the width at the surface of the second groove portion is equal to L2, this width being equal to L1', while at the bottom of the second portion 22 the width is equal to L2', the latter itself being equal to L1.

In this variant, the first groove portions 21 and second groove portions 22 are the same length. Those skilled in the art may of course adapt the respective lengths P1, P2 of these first and second portions as a function of the targeted goal.

In the example shown for the understanding of the invention, the connections between portions are made in an abrupt manner. Of course, it is possible for these connections to be realized such that there is a continuity of gradients measured on the level curves. A level curve is understood to be a corner edge formed by the groove on a tread surface in a state of wear of the tread.

FIG. 2 shows a view in cross section of the groove shown in FIG. 1 on a section plane, the line of which is indicated by the line II-II.

In this configuration, it is observed that there is an open section 3 between the groove portions, to form a passage able to ensure a continuity of the flow of liquid in the groove. It is observed that the maximum width Lc of this passage section 3 is located substantially at mid-depth of the groove 2.

FIGS. 3 to 5 show the outline of the corner edges formed by the groove on the tread surface at different levels of wear.

FIG. 3 shows the opening, on the tread surface when new, of the groove according to the variant shown in FIG. 1. It is possible to distinguish between the open parts of width L1 and the open parts of width L2, less than the width L1.

FIG. 4 shows the same tread surface after wear substantially equal to 50% of the depth P of the groove. At mid-wear, it can be seen that the corner edges are substantially parallel and spaced apart from one another by a width Lc.

FIG. 5 shows the tread surface after wear corresponding to the legal wear limit. A geometry that is substantially identical to that which was pre-existing in the new state is observed, since the second portions are now open on the tread surface with a width L2' equal to the width L1 of the first portions on the tread surface when new.

By virtue of the invention, it is possible to have, for all levels of wear, an opening surface area of the groove on the tread surface that is greater than a minimum value chosen beforehand by those skilled in the art, while substantially reducing the voids volume to the bare minimum required to ensure good drainage.

FIG. 6 shows, in section, another variant of a groove 2 according to the invention. In this variant, each first groove portion 21 comprises, at the bottom 210, a part of height B and of constant width L1'; this part corresponds to what remains of the groove 2 when the wear limit is reached and when the thickness E of the tread is entirely worn away.

In addition, each second groove portion 22 comprises a part of width L2 extending over a depth A. Thus, it is possible, in the new state, that, when in the contact patch in contact with the road surface, each second groove portion 22 may be closed over this height A by contact between the facing walls, in order to increase the stiffness of the tread while retaining a liquid draining ability, since there is a continuity of drainage between the groove portions. Indeed, the first portions 21 are open on the tread surface for capturing liquid while there is a continuous passage 3 in the groove from one portion to another, this passage 3 enabling the circulation of liquid.

Figure 7:
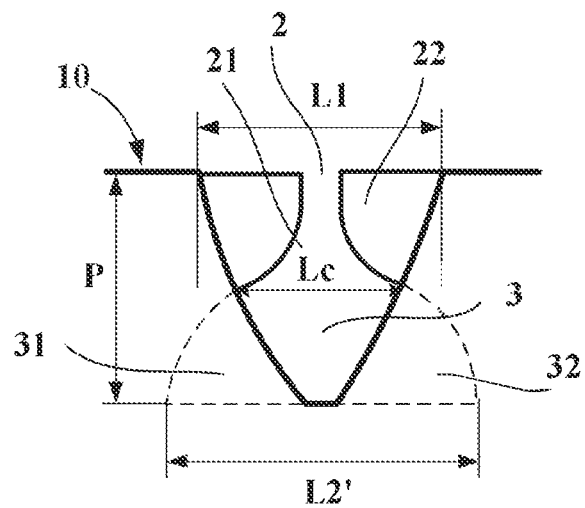
FIG. 7 represents, in section, another variant of a groove according to the invention.

In the variant shown in FIG. 7, the dimensions of the second portions 22 are chosen such that the width L2' at the bottom is greater than the maximum width L1 at the surface of the first portions 21, in order to form cavities 31, 32 in the walls of the groove 2. By virtue of this arrangement, it is possible to position the maximum width Lc of the section of the passage 3 at a depth closer to the tread surface 10 when new and to increase the available groove volume.

The geometries of the grooves described make it possible to preserve continuity of flow in the appropriate groove while optimizing the volume of material in contact with the road surface.

Figure 8:
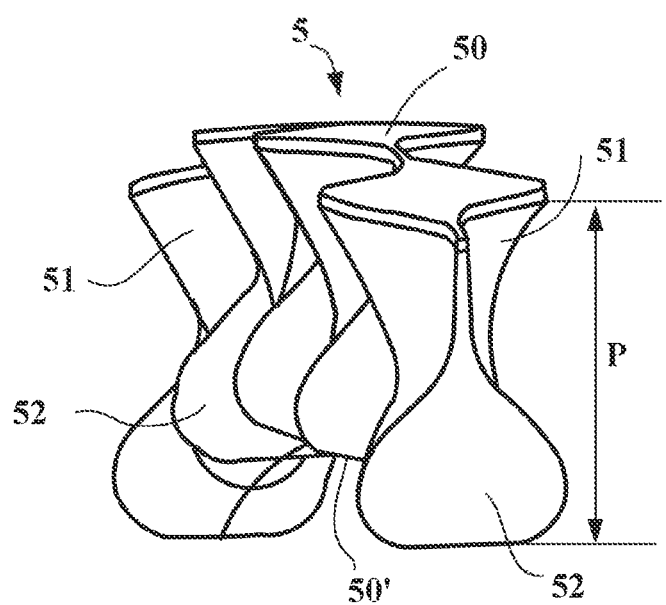
FIG. 8 shows a moulding element used in a tread mould for moulding a groove variant according to the invention, this groove having connections between the first and second groove portions.

FIG. 8 shows a moulding element 5 used in a tread mould for moulding a groove variant according to the invention, this groove having connection regions between the first and second groove portions. This moulding element 5 is formed of alternating first element parts 51 and second element parts 52; each first part 51 moulds a first groove portion while each second part 52 moulds a second groove portion. This type of moulding element may advantageously be produced according to a manufacturing process by selectively melting layers of superposed powder, commonly referred to as sintering; this process is described notably in publication WO 2016/016136. By virtue of this moulding element, a groove is moulded that is formed of alternating groove portions having a surface area that is open on the tread surface and which decreases down to the deepest depth of the groove, while on either side of these portions, groove portions are moulded having a surface area that is open on the tread surface and which increases down to the deepest depth. Tread surface is intended here to mean the surface in question at each state of wear of the tread.

The upper face 50 is intended to be linked to the tread mould. The lower face 50' moulds the bottom of the groove.

In this variant, first and second element parts are alternated, each part being constructed on a form of identical basis, with the exception of the orientation. Indeed, a first part, a width L1 at the tread surface when new, has a width that decreases in height and finishes with a width L1' less than L1, while a second part has the same dimensions as the first part but is upside down such that its smallest width is at the tread surface when new.

Here, the first and second parts of the moulding element are connected together by geometrically continuous forms that are themselves continuously derivable. In this way, it is possible to ensure a gentle transition between the different parts of the moulding element, which is favourable for the flow of liquid inside the groove moulded by virtue of this moulding element.

The invention also relates to a tire provided with a tread as described and even more particularly to a tire intended to be fitted to the steering axle of a heavy-duty vehicle.

Of course, the invention is not limited to the examples described and shown and various modifications can be made thereto without departing from the scope as defined in the claims. Notably, that which has been described with a groove mainly oriented in the circumferential direction may be applied to an obliquely-oriented or transversely-oriented groove.

Likewise, the invention may be implemented on different types of tires, whether tires for heavy-duty vehicles, tires for passenger vehicles or any other type of tire for which it is necessary to have a minimal voids volume to ensure sufficient drainage while limiting this volume to obtain good wearing performance.

The invention claimed is:

1. A tire tread comprising a tread surface adapted to come into contact with a road surface, said tread having at least one main groove that, when new, opens onto the tread surface of the tread, this main groove having a maximum depth, said main groove comprising a plurality of first groove portions and a plurality of second groove portions, said first and second groove portions being arranged alternately such that a first portion is followed by a second portion, wherein each said first groove portion has a width that decreases with wear, each said first groove portion having a maximum width measured on the tread surface when new and a maximum width at the maximum depth, the maximum width at the maximum depth being less than the maximum width on the tread surface, each said second groove portion has a width that increases with wear, each said second groove portion having a maximum width measured on the tread surface when new and a maximum width at the maximum depth, the maximum width on the tread surface being less than the maximum width at the maximum depth, the first and second groove portions are arranged so as to form a void passage between the volumes delimited by the first and second groove portions over the whole length of the groove, said passage having a cross section, the maximum width of which is located between 30% and 85% of the depth of the groove, wherein the variations in the widths of the first and second groove portions are continuous, and wherein the main groove, comprising the plurality of first groove portions and the plurality of second groove portions, extends along the tread so as to have a symmetrical geometry relative to an axis extending in the main direction of the groove.

2. The tire tread according to claim 1, wherein, over at least 50% of the thickness of the tread, the content of surface voids is at least equal to 40% and at most equal to 60% of the surface area of surface voids obtained with a continuous groove with a width equal to the maximum width of the first groove portions on the tread surface when new.

3. The tire tread according to claim 1, wherein the width of the bottom of the first groove portions is at least five times larger than the width of the second groove portions at the tread surface when new.

4. The tire tread according to claim 1, wherein the void volumes of the first groove portions are identical, or virtually identical, to the volumes of the second portions, in the latter case the difference in volume being at most 10% of the largest volume.

5. The tire tread according to claim 1, wherein, between a first said groove portion and a second said groove portion, a connection region is formed between said portions.

6. The tire tread according to claim 1, wherein, the groove formed of a plurality of first said groove portions and said second groove portions intersecting the tread surface when new along two corner edges, said corner edges have identical and symmetrical geometries relative to the axis extending in the main direction of the groove.

7. A tire for a heavy-duty vehicle, provided with the tread according to claim 1.

* * * * *